US007839519B2

(12) United States Patent
Aoki

(10) Patent No.: US 7,839,519 B2
(45) Date of Patent: Nov. 23, 2010

(54) IMAGING DEVICE

(75) Inventor: Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1191 days.

(21) Appl. No.: 10/899,110

(22) Filed: Jul. 27, 2004

(65) Prior Publication Data

US 2005/0024670 A1 Feb. 3, 2005

(30) Foreign Application Priority Data

Jul. 31, 2003 (JP) ............................ 2003-283711

(51) Int. Cl.
*G06K 15/00* (2006.01)
*H04N 1/46* (2006.01)

(52) U.S. Cl. .................... 358/1.15; 358/1.17; 358/1.18; 358/1.2; 358/505

(58) Field of Classification Search ................ 358/1.13, 358/1.15, 1.16, 468, 1.14; 705/29; 399/8; 101/484; 400/615.2; 709/223; 347/14, 7; 377/15
See application file for complete search history.

(56) References Cited

U.S. PATENT DOCUMENTS

| | | | | |
|---|---|---|---|---|
| 5,010,820 | A * | 4/1991 | Loffler | 101/484 |
| 5,383,129 | A * | 1/1995 | Farrell | 377/15 |
| 5,953,132 | A * | 9/1999 | Kurosawa et al. | 358/468 |
| 6,106,176 | A * | 8/2000 | Yanagisawa et al. | 400/615.2 |
| 6,516,157 | B1 * | 2/2003 | Maruta et al. | 399/8 |
| 6,626,510 | B2 * | 9/2003 | Maeda | 347/7 |
| 6,975,415 | B2 * | 12/2005 | Yamade | 358/1.13 |
| 6,975,423 | B2 * | 12/2005 | Koakutsu et al. | 358/1.16 |
| 2001/0019343 | A1 * | 9/2001 | Walker et al. | 358/1.15 |
| 2001/0037267 | A1 * | 11/2001 | Sato et al. | 705/29 |
| 2002/0071133 | A1 * | 6/2002 | Haines | 358/1.13 |
| 2002/0075501 | A1 * | 6/2002 | Mantell et al. | 358/1.14 |
| 2002/0143642 | A1 * | 10/2002 | Harper | 358/1.15 |
| 2002/0165833 | A1 | 11/2002 | Minowa et al. | |
| 2002/0171866 | A1 * | 11/2002 | Parry et al. | 358/1.15 |

(Continued)

FOREIGN PATENT DOCUMENTS

JP 4-338767 A 11/1992

(Continued)

OTHER PUBLICATIONS

Notification of Reasons for Rejection issued in Japanese Patent Application No. 2007-292889; mailed Aug. 24, 2010; with English-language translation.

*Primary Examiner*—King Y Poon
*Assistant Examiner*—Akwasi M Sarpong
(74) *Attorney, Agent, or Firm*—Oliff & Berridge, PLC

(57) ABSTRACT

An imaging device is configured to operable in a normal print mode and in an economical print mode. The imaging device includes an image storage, a cost calculating system that calculates a normal print cost representing a cost when the image is printed in the normal print mode, an upper limit setting system that sets an upper limit of the print cost. Further provided is an adjustment parameter determining system that determines an adjustment parameter representative of reduced quantity of consumable substances when the image data is printed. The adjustment parameter is calculated based on the upper limit and the normal print cost such that a print cost is suppressed below the upper limit if the image data stored in the image storage is printed in accordance with the adjustment parameter. A printing system is provided to print the image in accordance with the adjustment parameter.

21 Claims, 6 Drawing Sheets

U.S. PATENT DOCUMENTS

| | | | | |
|---|---|---|---|---|
| 2003/0002074 | A1 * | 1/2003 | Miyano | 358/1.15 |
| 2003/0018775 | A1 * | 1/2003 | Shiba et al. | 709/223 |
| 2003/0222931 | A1 * | 12/2003 | Im et al. | 347/14 |

FOREIGN PATENT DOCUMENTS

| | | | |
|---|---|---|---|
| JP | 11-084963 | A | 3/1999 |
| JP | 2000-298418 | A | 10/2000 |
| JP | A-2001-063189 | | 3/2001 |
| JP | 2001-092319 | A | 4/2001 |
| JP | A-2002-268861 | | 9/2002 |
| JP | A 2002-304281 | | 10/2002 |

* cited by examiner

IMAGING DEVICE

BACKGROUND OF THE INVENTION

The present invention relates to an imaging device which enables a user to print an image within a desired cost.

Conventionally, an imaging device which calculates an estimate cost for printing an image, taking toner to be consumed for printing into account. An example of such an imaging device is disclosed in Japanese Patent Provisional Publication No. HEI 11-84963. According to the imaging device as disclosed, the estimated cost for printing an image is notified to a user based on the estimated toner consumption, which is estimated in accordance with a print mode designated by the user.

Such an imaging device is convenient since the user can know the cost before printing. In some cases, however, the user may have a planned cost first, and printing should be performed within the planned cost. It should be noted that the printing condition should be determined to satisfy both the requirement of the cost and the quality of the printed image.

In such a case, when the conventional imaging device is used, if the print mode set by the user does not meet the planned cost, the user sets the print mode again and again till it is assured that the printing is performed within the planned cost. Such a try and error operation takes time in order to obtain an optimum printing condition.

Further, if the user intends to obtain an image having satisfactory quality even if the cost does not meet the planned cost, the user selects a mode providing images of the satisfactory quality. Even in such case, according to the above-described imaging device, the estimated cost is notified, which is bothersome.

SUMMARY OF THE INVENTION

The present invention is advantageous in that an improved imaging device is provided, with which printing can be performed within a desired cost in relatively a short period of time.

According to an aspect of the invention, there is provided an imaging device operable in a normal mode and in an economical mode, which is provided with an image storage that stores image data, a consumption quantity calculating system that obtains calculated quantity of a consumable substance which is consumed when the image data is printed in the normal print mode, the calculated quantity being obtained based on the number of dots to be printed, an upper limit setting system that sets an upper limit of a print cost necessary for printing the image data, a consumption quantity modifying system that determines a usable quantity of the consumable substance when the image data is printed by modifying the calculated quantity so that the usable quantity is within the quantity corresponding to the upper limit of the print cost set by the upper limit setting system, and a printing system that prints the image data stored in the image storage using the consumable substance such that the quantity of the consumable substance to be used is within the usable quantity obtained by the consumption quantity changing system.

Optionally, the upper limit setting system may set a predetermined value as the upper limit. Alternatively or optionally, the upper limit setting system may allow a user to input an arbitrary value, which is set as the upper limit.

In a particular case, the consumption quantity changing system may determine usable quantity such that the quantity of the consumable substance in printing the image data is substantially equal to the quantity of the consumable substance corresponding to the upper limit.

Optionally, the imaging device may include an upper limit mode selecting system that selects an upper limit print mode in which the printing is performed based on the upper limit.

The imaging device may further include a comparing system that compares the calculated quantity of the consumable substance calculated by the consumption quantity calculating system with the quantity of the consumable substance corresponding to the upper limit. In such a case, the printing system may print the image data stored in the image storage using the consumable substance within the range of the usable quantity modified by the consumption quantity changing system when the comparing system determines that the calculated quantity is greater than the quantity of the consumable substance corresponding to the upper limit.

Further optionally, when the change from the calculated quantity to the usable quantity is greater than a predetermined changeable value, the user may be notified that the change from the calculated quantity to the usable quantity is greater than the predetermined changeable value.

Optionally or alternatively, when the change from the calculated quantity to the usable quantity is greater than a predetermined changeable value, the printing is performed with the quantity of the consumable substance being set to its minimum value. Further, when the change from the calculated quantity to the usable quantity is not greater than the predetermined changeable value, the printing may be performed with the usable quantity.

Optionally, when the image storage stores a plurality of pages of image data, the consumption quantity calculating system may calculate the calculated quantity of the consumable substance based on the number of the print dots of all the pages of the image data stored in the image storage, and the consumption quantity changing system may modify the calculated quantity such that total usable quantity of the consumable substance is equal to or less than the quantity corresponding to the total quantity of the consumable substance for printing the image at the upper limit.

Alternatively, when the image storage stores a plurality of pages of image data, the consumption quantity calculating system calculates the calculated quantity of the consumable substance based on the number of the print dots of each page of the image data stored in the image storage, and the consumption quantity changing system may modify, for each page of image data, the calculated quantity such that the usable quantity of the consumable substance is equal to or less than the quantity corresponding to the quantity of the consumable substance for printing the image at the upper limit.

In this case, the upper limit setting system may set the upper limit of the print cost for printing image on one recording sheet.

In a particular case, the printing system may be configured to print a color image, and the consumable substance may include a plurality of color components. Further, the consumption quantity calculating system may calculate the calculated quantity of all the color components of the consumable substance.

According to another aspect of the invention, there is provided an imaging device operable in a normal print mode and in an economical print mode, which includes an image storage that stores image data to be printed, a cost calculating system that calculates a normal print cost representing a cost when the image stored in the image storage is printed in the normal print mode, an upper limit setting system that sets an upper limit of the print cost, an adjustment parameter determining system that determines an adjustment parameter representative of reduced quantity of a consumable substances when the image data is printed, the adjustment parameter being calculated based on the upper limit and the normal print cost such that a print cost is suppressed below the upper limit if the image data stored in the image storage is printed in accordance with the adjustment parameter, and a printing system that prints the image stored in the image storage in accordance with the adjustment parameter.

Optionally, the upper limit setting system may set a predetermined value as the upper limit. Alternatively or optionally, the upper limit setting system may allow a user to input an arbitrary value, which is set as the upper limit.

Further optionally, when the normal print cost is greater than the upper limit, the printing system may print the image data in accordance with the adjustment parameter, and when the normal print cost is equal to or less than the upper limit, the printing system may print the image data in the normal print mode.

Still optionally, when the adjustment parameter is smaller than a predetermined value, the user may be notified that the image quality will be low.

Alternatively or optionally, when the adjustment parameter is smaller than a predetermined value, the adjustment parameter may be set to the predetermined value.

Further optionally, the cost calculating system may calculate the normal print cost based on the number of print dots of the image data.

Optionally, the imaging device may include a data storage that stores a normal print cost for one dot of image data.

Further optionally, the imaged data may include a plurality of pages of image data, and the cost calculating system may calculate the normal print cost for all the pages of the image data.

Alternatively, the imaged data includes a plurality of pages of image data, and the cost calculating system may calculate the normal print cost for each page of the image data.

According to a further aspect of the invention, there is provided a computer program product having computer readable instructions that cause a computer to function as an imaging device operable in a normal mode and in an economical mode. The computer program product may include the instructions of calculating a calculated quantity of a consumable substance which is consumed when the image data is printed in the normal print mode, the calculated quantity being obtained based on the number of dots to be printed, setting an upper limit of a print cost necessary for printing the image data, determining a usable quantity of the consumable substance when the image data is printed by modifying the calculated quantity so that the usable quantity is within the quantity corresponding to the upper limit of the print cost, and printing the image data using the consumable substance such that the quantity of the consumable substance to be used is within the usable quantity.

Optionally, when the change from the calculated quantity to the usable quantity is greater than a predetermined changeable value, the printing is performed with the quantity of the consumable substance being set to its minimum value, and when the change from the calculated quantity to the usable quantity is not greater than the predetermined changeable value, the printing is performed with the usable quantity.

BRIEF DESCRIPTION OF THE ACCOMPANYING DRAWINGS

Figure 4:
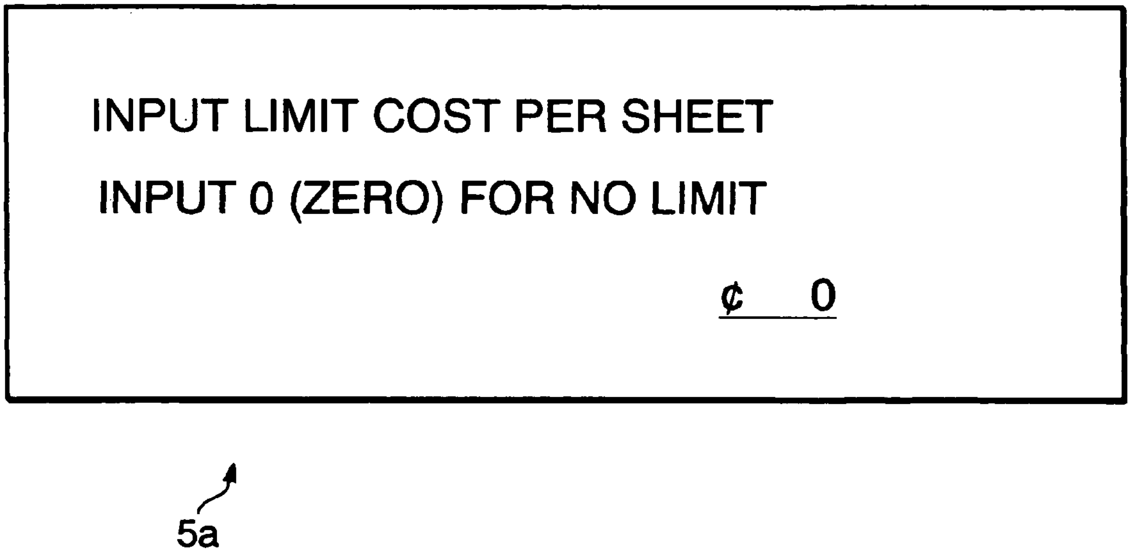
Figure 5:
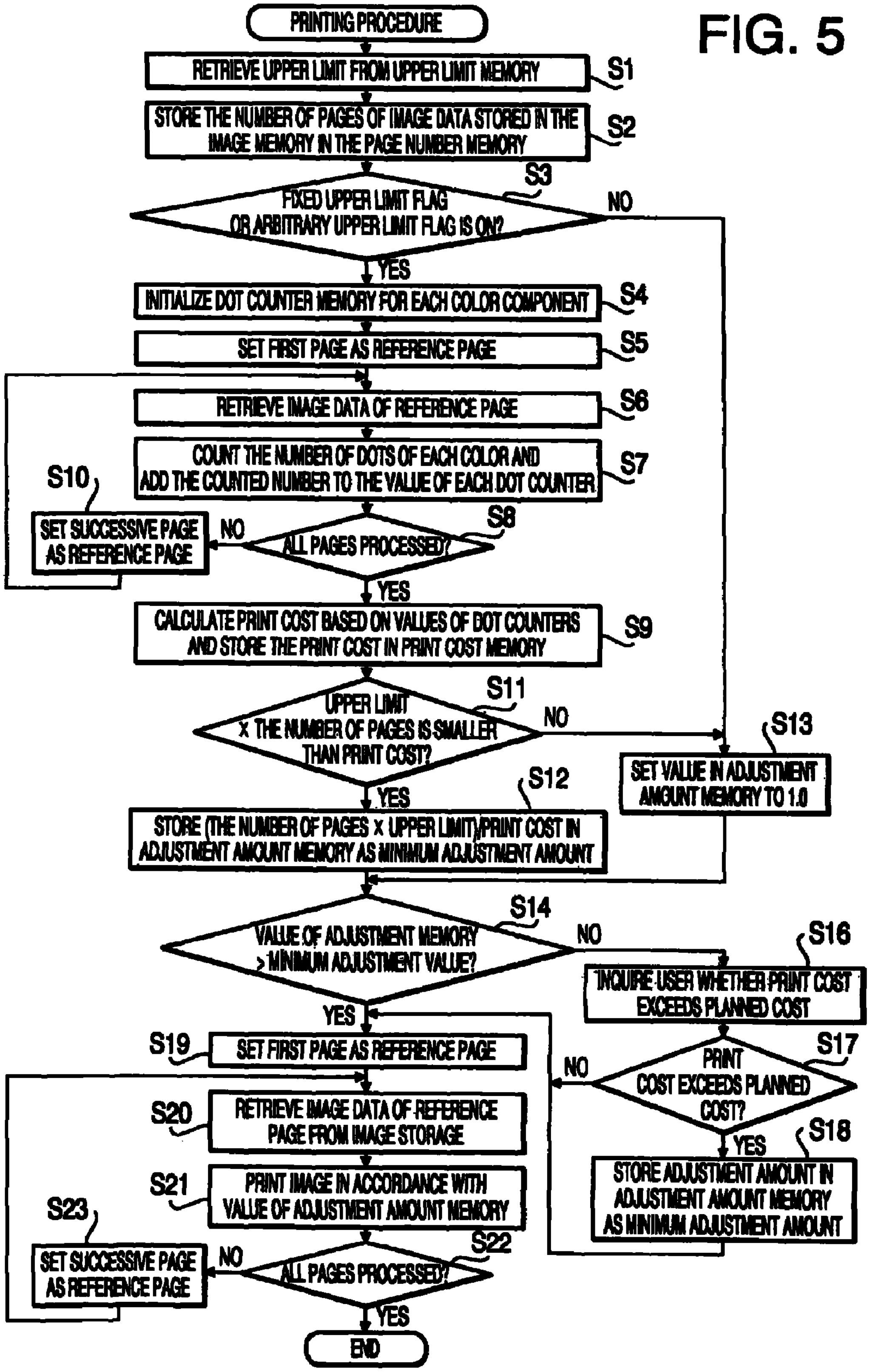
Figure 6:
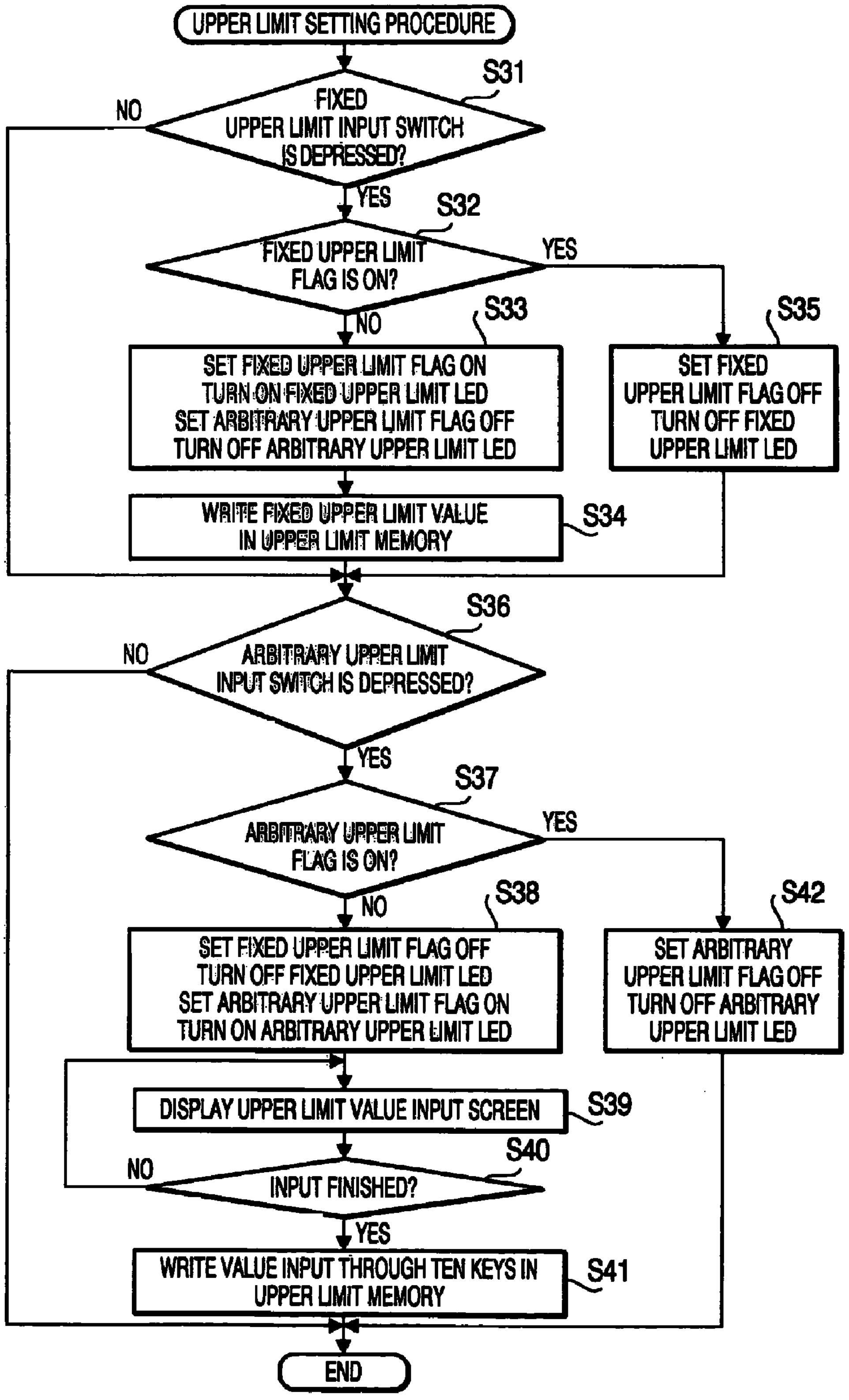
Figure 7:
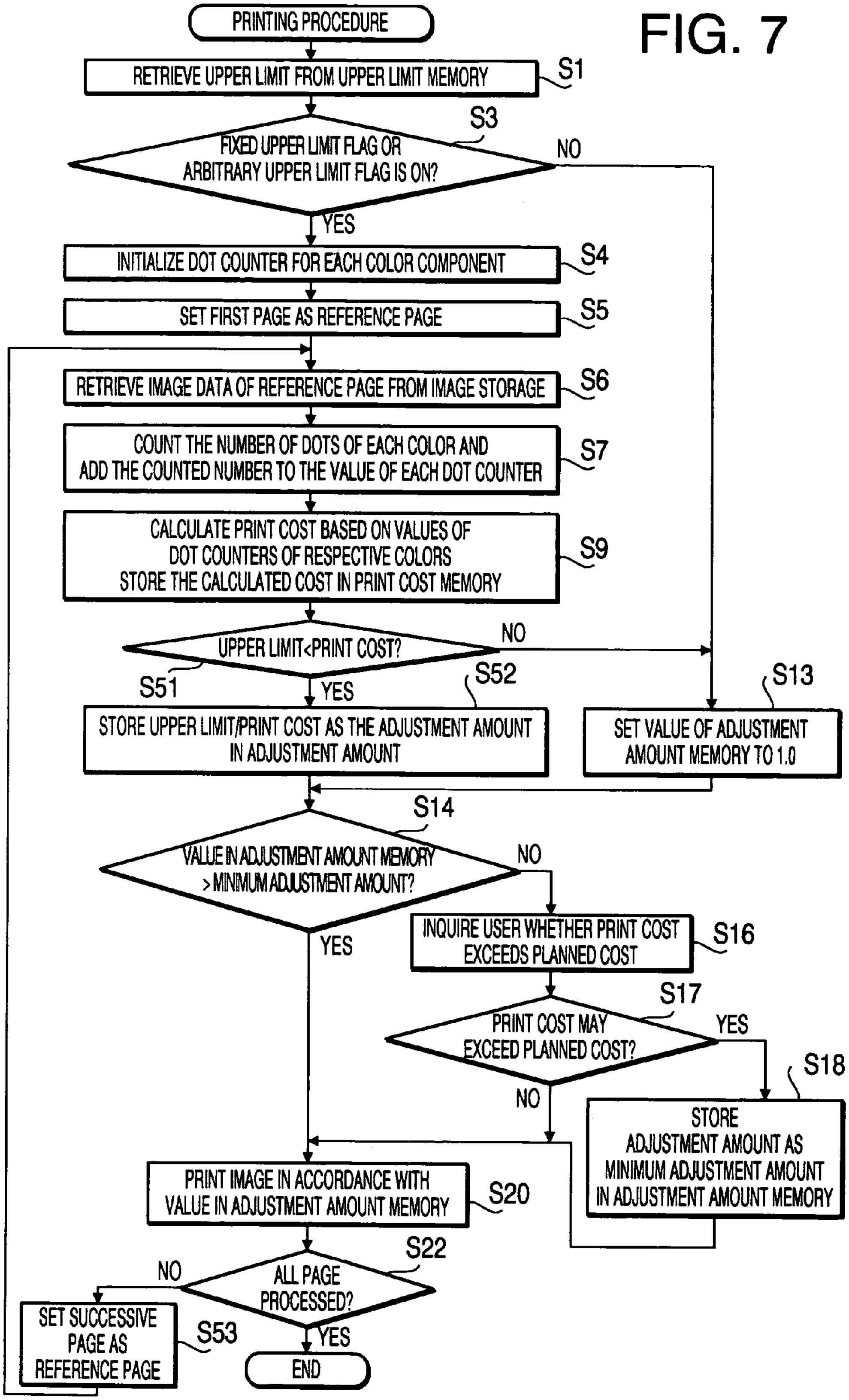

FIG. 4 an example of a message displayed on an LCD during an upper limit setting procedure;

FIG. 5 shows a flowchart illustrating a printing procedure executed in the MFP;

FIG. 6 shows a flowchart illustrating the upper limit setting procedure; and FIG. 7 shows a flowchart illustrating a printing procedure according to a modification of the printing procedure shown in FIG. 5.

DETAILED DESCRIPTION OF THE EMBODIMENT

Hereinafter, referring to the accompanying drawings, imaging devices according to embodiment and modification of the present invention will be described.

Figure 1:
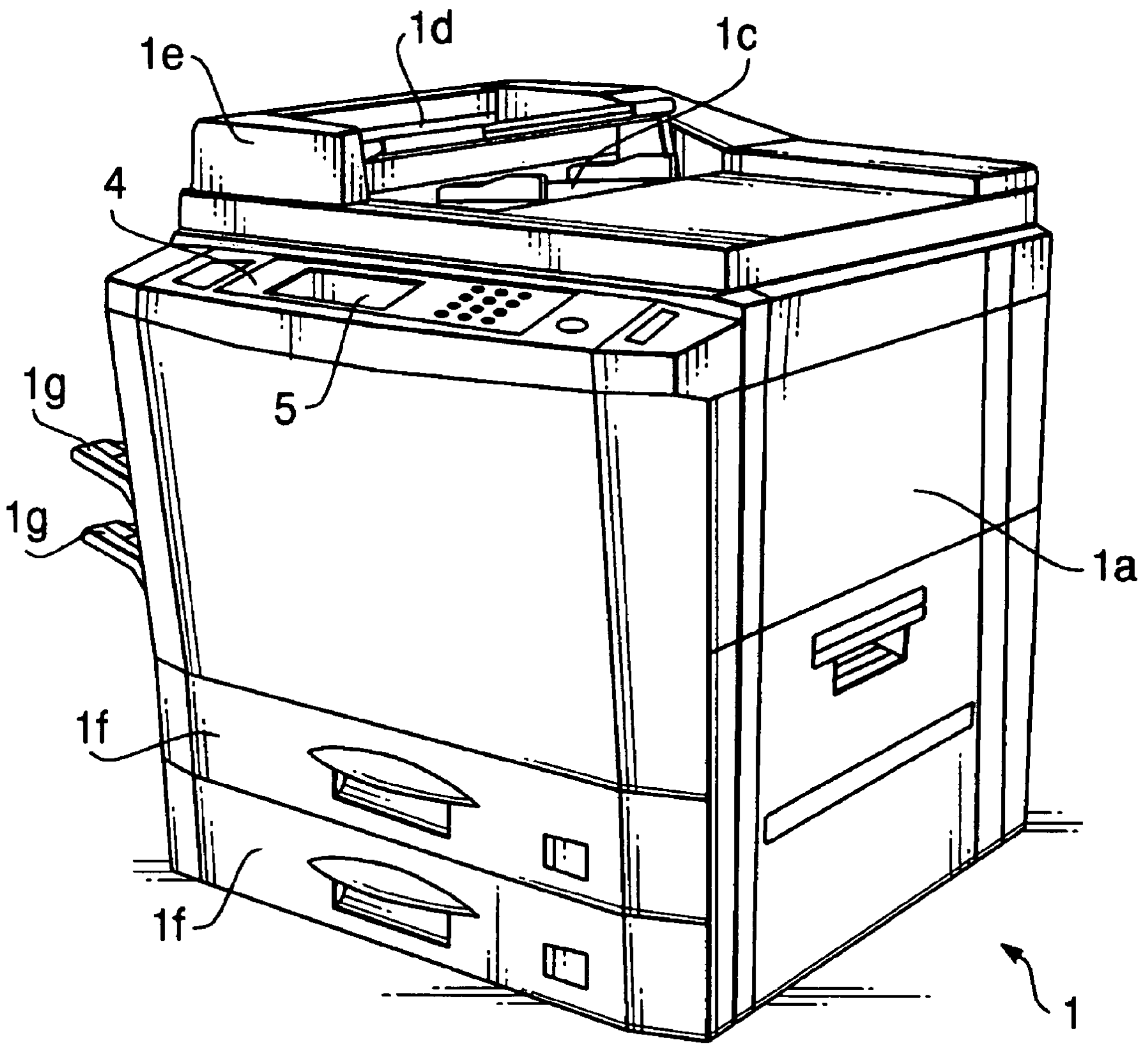
FIG. 1 shows a perspective view of an MFP (multi-function peripheral) which is an example of an imaging device according to an embodiment of the invention.

FIG. 1 shows a perspective view showing an appearance of the MFP 1 according to the embodiment. The MFP 1 shown in FIG. 1 is wire-connected to a public telephone line network (not shown) provided by a communication carrier through a telephone line. In this embodiment, the MFP 1 is configured to have a facsimile communication function for transmitting/receiving digitized image data, a scanner function for optically reading an original and creating digitized image data (scanned image), a copier function for scanning an image using the scanner function and forming the image on a recording medium, and a printer function for printing an image in accordance with print data transmitted from a personal computer (PC).

On an upper front portion of a main body 1*a* of the MFP 1, an operation panel 4 is provided. The operation panel 4 includes a fixed upper limit button 4*a*, an arbitrary upper limit button 4*b* and ten keys 4*d* and an LCD (liquid crystal display) 5. The LCD 5 is a display for displaying an operation currently performed and a communication condition regarding a communication with a PC 35 connected with the MFP 1 or a communication with another device connected via a telephone line 26 (see FIG. 2). When the MFP 1 is operated through the command input keys provided on the operation panel 4, the operational status and operational procedures are displayed on the LCD 5. Further, a touch panel is provided to the LCD 5. Command input buttons are displayed on the LCD 5, and a user can input commands by touching the command input buttons through the touch panel.

Figure 3:
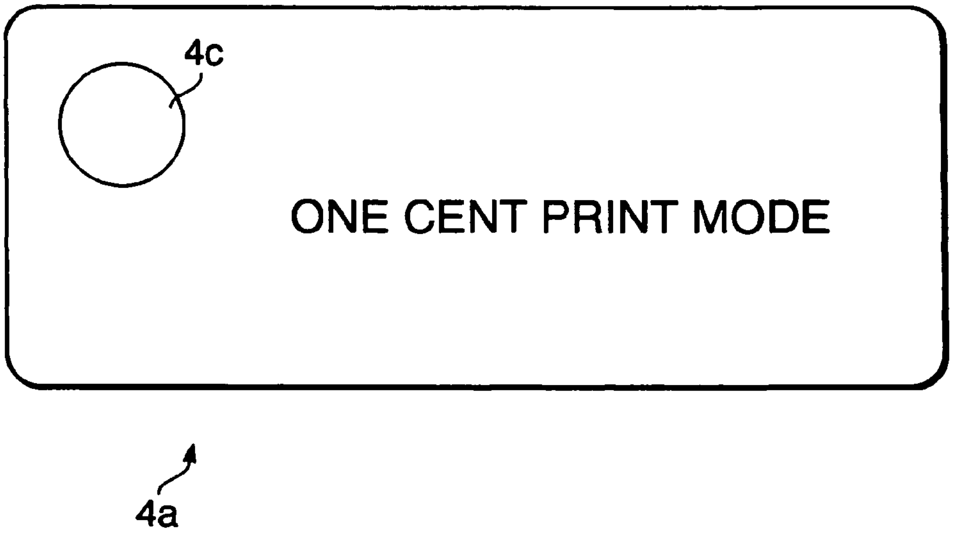
FIG. 3 shows a fixed upper limit button of the imaging device.

FIG. 3 shows the fixed upper limit button 4*a*. When the user depresses the fixed upper limit button 4*a*, a one-cent print mode is selected, and a fixed upper limit LED 4*c* is lit. When the one-cent print mode is selected, the quantity of the ink to be used for printing in a printing procedure shown in FIG. 5 is suppressed to be less than the quantity that costs one cent.

When the user depresses a not-shown arbitrary upper limit button 4*b*, an arbitrary upper limit print mode is selected and an arbitrary upper limit LED (not shown) is lit. When the arbitrary upper limit mode is selected, the quantity of the ink for one-page printing is limited to the quantity corresponding to the cost which has been arbitrarily determined (preliminarily input) by the user. Since the configuration of the arbitrary upper limit button is similar to the fixed upper limit button, it is not shown in the drawing.

FIG. 4 shows an image displayed on the LCD 5 when the limit cost for the arbitrary limit mode is to be input. The user may input the desired upper limit of the cost for printing one-page image.

When a normal print mode is selected, neither the fixed upper limit LED 4*c* nor the arbitrary upper limit LED is lit. The normal print mode is a print mode in which the quantity of the ink to be consumed is not suppressed.

On a top surface of the main body 1*a*, an original feeder 1*e* having an original inlet 1*c* and an original outlet 1*d* is provided. The original to be copied is inserted from the original inlet 1*c* with its image carrying surface directed downward. The original inserted in the original inlet 1*c* is fed, by the original feeder 1*e*, to the image scanning unit of the MFP 1. After the image formed on the original is scanned by a scanner (e.g., CCD line sensor) 22 provided inside the MFP 1, the original is discharged from the original outlet 1*d*.

At a lower portion of the main body 1*a*, a sheet feed trays if which mount a plurality of types of recording sheets, and is configured to drawable with respect to the main body la are provided. From the sheet feed trays 1*f*, a recording sheet on which the scanned image is printed, is supplied inside the main body 1*a* as a sheet feed motor is driven. The recording sheet on which the image is printed is discharged from the main body la through recording sheet outlets 1*g* formed on the side surface of the MFP 1.

Figure 2:
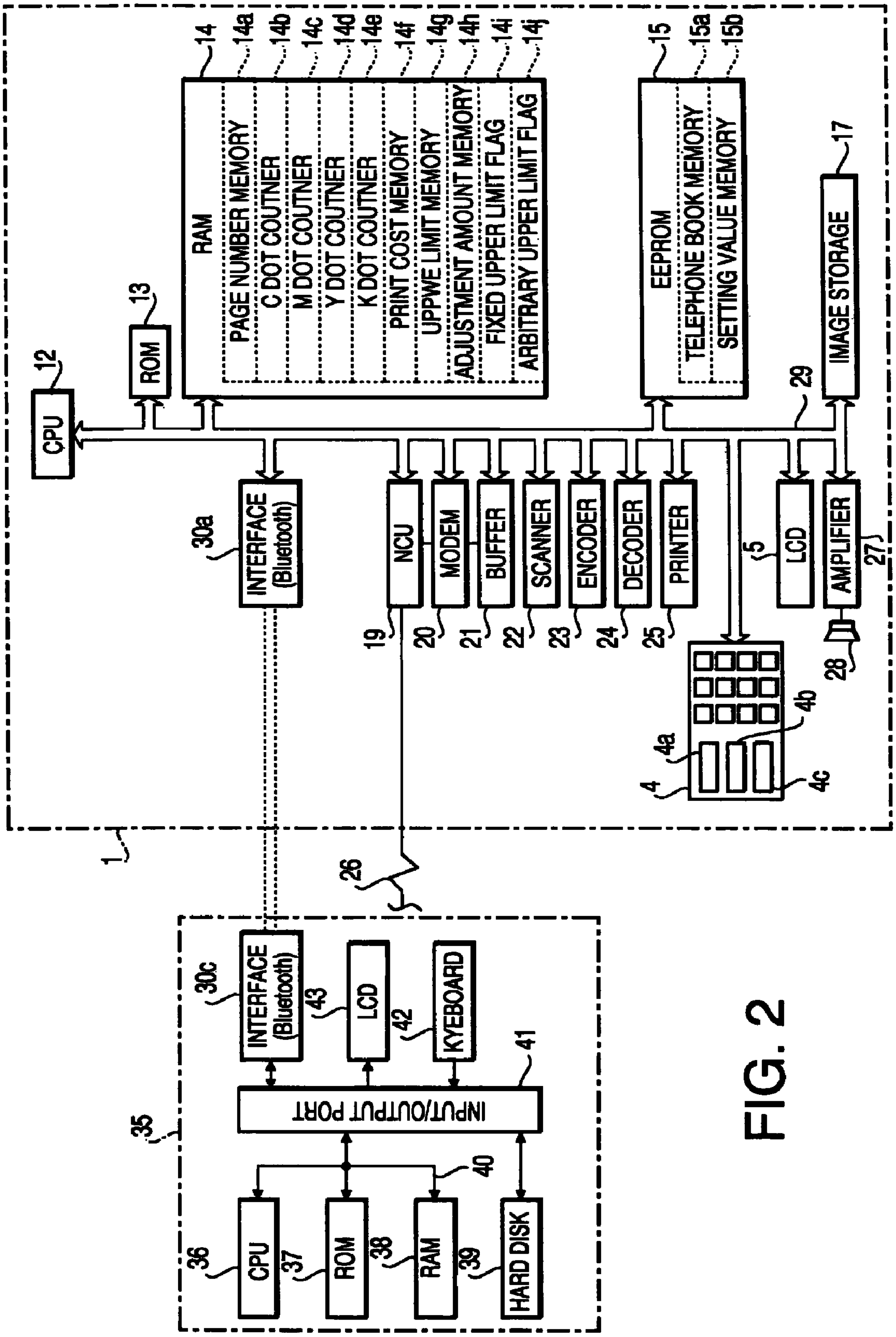
FIG. 2 is a block diagram showing an electrical configuration of the MFP shown in FIG. 1 and an external device connected to the MFP.

FIG. 2 is a block diagram showing an electric configuration of the PFP 1 and the PC 35.

As shown in FIG. 2, the MFP 1 has a CPU 12, a ROM 13, a RAM 14, an EEPROM 15, an image storage 17, a network control unit (NCU) 19, a modem 20, a buffer 21, the scanner 22, an encoder 23, a decoder 24, a printer 25, the operational panel 4, the LCD 5, an amplifier 27 and an interface 30*a*, which are interconnected through a bus line 29.

The NCU 19 is for the line control, and the MFP 1 is connected to the telephone line 26 through the NCU 19. The NCU 19 receives the ringing tone signal and various other signals transmitted from an exchanger through the telephone line 26. The NCU 19 further operates to transmit dialing signals corresponding to the operation through the input keys of the operation panel 4. When the telephone line 26 is closed (i.e., the connection is established), the NCU 19 can also operate to transmit/receive facsimile data.

The CPU 12 executes the facsimile transmission operation, printing operation and the like by controlling respective components connected to the bus line 29, in accordance with the signals transmitted through the NCU 19. The ROM 13 is a non-volatile read-only memory storing control programs to be executed by the MFP 1. It should be noted that the procedures shown in FIGS. 5-7 are stored in the ROM 13 as programs to be executed by the CPU 12.

The control programs are for controlling various operations performed by the MFP 1, which include the facsimile transmission operation, printing operation and data communication between the MFP 1 and the PC 35. In particular, the control programs include printing procedure and upper limit setting procedure.

The RAM 14 temporarily stores various data and includes page number memory 14*a*, C dot counter memory 14*b*, M dot counter memory 14*c*, Y dot counter memory 14*d*, K dot counter memory 14*e*, print cost memory 14*f*, upper limit memory 14*g*, adjustment amount memory 14*h*, fixed upper limit flag 14*i* and arbitrary upper limit flag 14*j*.

The page number memory 14*a* stores the number of pages of image data stored in the image storage 17. In the page number memory 14*a*, the number of pages of image data to be printed in a print job is stored in the printing procedure shown in FIG. 5 (described later).

The C dot counter memory 14*b*, M dot counter memory 14*c*, Y dot counter memory 14*d* and K dot counter memory 14*e* respectively store the numbers of dots (pixels) of the color components which would be used if the image data stored in the image storage 17 is printed according to the normal print mode.

Each of the C dot counter memory M dot counter memory 14*c*, Y dot counter memory 14*d* and K dot counter memory 14*e* is initialized to have a value zero when the printing procedures shown in FIG. 5 is started. Then, when the number of dots for each color component necessary for printing one page of image data is calculated in the procedure, each counter memory is updated as the calculated number of dots is accumulatively added.

The print cost memory 14*f* stores a printing cost which is calculated based on commodity expenses when the image data stored in the image storage 17 is printed in the normal print mode. The cost is calculated in the printing procedure shown in FIG. 5, which is stored in the print cost memory 14*f*.

The upper limit memory 14*g* stores the upper limit of the printing cost for printing the image data stored in the image storage 17. In the upper limit memory 14*g*, the upper limit which is set during an upper limit setting procedure shown in FIG. 6 is stored.

The adjustment amount memory 14*h* is a memory storing the adjustment amount of the ink when the printing using the printer 25 is executed. In the adjustment amount memory 14*h*, the adjustment amount calculated during the printing procedure shown in FIG. 5 is stored.

The fixed upper limit flag 14*i* represents whether the fixed upper limit is set or not. The fixed upper limit flag 14*i* is switched between ON and OFF by depression of the fixed upper limit button 4*a*.

The arbitrary upper limit flag 14*j* represents whether the arbitrary upper limit is set or not. The arbitrary upper limit flag 14*j* is switched between ON and OFF by depression of the arbitrary upper limit button 4*b*.

The EEPROM 15 is a rewritable non-volatile memory. The data stored in the EEPROM 15 is retained after the EEPROM 15 is powered off. The EEPROM 15 typically stores various data and setting values set/registered by an operator. In this example, the EEPROM 15 includes a telephone book memory 15*a* and setting value memory 15*b*. The MFP 1 is configured such that, by a predetermined operation, a data input screen for allowing the operator to input various data and setting values is displayed on the LCD 5. The data/settings input through the input screen are stored in the telephone book memory 15*a* and the setting value memory 15*b*.

The telephone book memory 15*a* stores facsimile numbers of destination facsimile devices. The data stored in the telephone book memory 15*a* is retrieved when the facsimile transmitting operation is executed.

The setting value memory 15*b* generally stores setting values necessary when the wireless communication is performed between the MFP 1 and the PC 35. The data communication between the MFP 1 and the PC 35 is executed wirelessly, using electromagnetic wave. Therefore, a security measure for preventing eavesdropping is necessary. That is, when the wireless communication is executed, it is set that the communication can be performed only between the MFP 1 and the PC 35. Setting values for this restricted communication are stored in the setting value memory 15*b*. When the wireless communication is performed, the setting values stored in the setting value memory 15*b* are referred to.

Specifically, the setting values stored in the setting value memory 15*b* include channels of the interfaces 30*a* and 30*c*, and Extended Service Set IDs (hereinafter, simply referred to as ESSID). The channel is a path of data, which is invisible, and when the mutual communication is achieved, the interfaces 30*a* and 30*c* are set to use the same channel. Therefore, the channel of the MFP 1 and that of the PC 35 are set to the same channel, and the value is stored as the set value in the setting value memory 15*b*. In the wireless network system, the ESSID is a character string to be used for identifying individual network. The ESSID is set by the user, and assigned to each device.

The image storage 17 is for storing the entire image data. In the embodiment, the image storage 17 is constituted by a DRAM having a large capacity. In the MFP 1, when the facsimile data is received, it is temporarily stored in the image storage 17, and then, when the printer 25 can operate to print, transmitted to the printer 25. After printer by the printer 25, the facsimile data store din the image storage 17 is deleted. When the facsimile data is the image data, the size is generally large. However, the facsimile data is deleted when it is printed out. Therefore, the capacity of the image storage 17 is efficiently utilized. Further, in the image storage 17, the image data input through the PC 35 is also stored as image data files. In this case, the image data files are remained in the image memory, until a predetermined deleting operation is performed.

The modem 20 transmits/receives the image data as encoded/decoded data, and further transmits/receives various procedure signals for transmission control. The buffer 21 temporarily stores encoded facsimile data which is exchanged between another facsimile device.

The scanner 22 is for scanning the image of the originally inserted through the original inlet 1*c*. The encoder 23 encodes the scanned image of the original read by the scanner 22. The decoder 24 is for retrieving the received data stored in the buffer 21, and decodes the same. The decoded data is printed by the printer 25 on the recording sheet. The operation panel 4 is used for various operation such as the settings/operations of the MFP 1. The amplifier 27 amplifies audio signals input thereto to sound the speaker 28. For example, a ringing tone is output by the speaker.

The interfaces 30*a* and 30*c* are for connecting the MFP 1 and the PC 35. The interfaces 30*a* and 30*c* defines connection standards for data communication between different devices, and electrical configurations are defined thereby. According to the embodiment, the interfaces 30*a* and 30*c* employs a general use wireless communication standard know as Bluetooth. The Bluetooth is the interface utilizing the 2.45 GHz electromagnetic wave which can be used without license and allows the data communication at the speed of 1 Mbps. The Bluetooth requires a relatively low power consumption and manufacturing cost can be suppressed. Further, when a distance between the devices is 10 meters or smaller, the data communication can be performed even if there is an obstacle therebetween.

The PC 35 is a personal computer, and performs the data communication with the MFP 1. The PC 35 can transmit the data the PC 35 contains or input to the PC 35 to the MFP 1. Further, the PC 35 can receive the data transmitted from the MFP 1 and process the received data.

The PC 35 includes a CPU 36, a ROM 37, a RAM 38, a hard disk 39, an input/output port 41, a keyboard 42, an LCD 43 and an interface 30*c*, which are interconnected through a bus line 40.

The CPU 36 control each component connected through the bus line 40 based on the parameters stored in the ROM 37, transmitted/received by executing programs stored in the ROM 37 and/or transmitted/received signals through the interface 30*c*. The ROM 37 is a non-volatile non-rewritable memory and contains control programs to be executed in the PC 35. The RAM 38 is a memory for temporarily storing data.

The hard disk 39 is a non-volatile writable storage, and various data and programs, which may be installed when necessary, are stored therein. Specifically, programs stored in the hard disk 39 include programs for transmitting the data created in the PC 35 to the MFP 1, and programs for receiving and processing image data transmitted form the MFP 1.

The keyboard 42 is an input device provide with a plurality of keys, which are depressed and various alphanumeric characters assigned to respective keys are input. The input characters are displayed on the LCD 43.

The interface 30*c* complies with the same standard as that for the interface 30*a* of the MFP 1. Specifically, the interface 30*c* employs the Bluetooth standard. Through the interface 30*c*, the PC 35 is connected to the MFP 1, and the PC 35 can receive the image data from the MFP 1. The received data is stored in the RAM 38, and is displayed on the LCD 43 when a predetermined output operation is performed.

As shown in FIG. 2, the CPU 36, the ROM 37 and the RAM 38 are interconnected through the bus line 40, and the bus line 40 is connected to the input/output port 41. The input/output port 41 is also connected to the hard disk 39, keyboard 42, LCD 43 and the interface 30*c*.

Next, the procedures of the MFP 1 will be described with reference to the flowcharts shown in FIGS. 5 and 6.

FIG. 5 shows a flowchart of the print procedure which is executed at a timing when the image data scanned by the scanner 22, facsimile data transmitted to some other facsimile device and image data transmitted PC 35 is stored in the image storage.

In the printing procedure shown in FIG. 5, process retrieves the value stored in the upper limit memory 14*g* (S1). In the upper limit memory 14*g*, the upper limit, which is set during the upper limit setting procedure shown in FIG. 6, is stored. Next, process stores a value corresponding to the number of pages of the image data stored in the image storage 17 in the page number memory 14*a* (S2).

In S3, process determines whether the fixed upper limit flag 14*i* or the arbitrary upper limit flag 14*j* is ON. When neither the fixed upper limit flag 14*i* nor the arbitrary upper limit flag 14*j* is ON (S3: NO), it is determined that the user intends not to set the upper limit for printing and intends to execute the normal printing. Therefore, in this case, value 1.0 is stored in the adjustment amount memory 14*h* (S13).

If the fixed upper limit flag 14*i* or the arbitrary upper limit flag 14*j* is ON (S3: YES), it is determined that the user intends to execute the printing in an economical manner by using the upper limit. In this case, process proceeds to S4.

Next, process stores zero in each of the C dot counter memory 14*b*, M dot counter memory 14*c*, Y dot counter memory 14*d* and K dot counter memory 14*e* (S4). Then, process sets the first page of the image data stored in the image storage 17 as a reference page (S5).

In S6, process retrieves the image data of the reference page from the image storage. Based on the retrieved image data, process counts the number of dots of each of C (cyan), M (Magenta), Y (yellow) and K (black) components, and accumulatively stores the numbers of dots of the C, M, Y and K components in the C dot counter memory 14*b*, M dot counter memory 14*c*, Y dot counter memory 14*d* and K dot counter memory 14*e*, respectively (S7).

It should be noted that, when the numbers of the dots are counted for the first page of the image data, only the numbers of the dots of the first page are stored in the C dot counter memory 14$b$, M dot counter memory 14$c$, Y dot counter memory 14$d$ and K dot counter memory 14$e$. But, when the numbers of the dots for the second page or later are counted, the values are added when they are stored in the C dot counter memory 14$b$, M dot counter memory 14$c$, Y dot counter memory 14$d$ and K dot counter memory 14$e$. Thus, when all the pages of the image data are processed, the C dot counter memory 14$b$, M dot counter memory 14$c$, Y dot counter memory 14$d$ and K dot counter memory 14$e$ store the numbers of the dots of the entire image data stored in the image storage 17.

Next, process determines whether image data of all the pages stored in the image storage 17 has been retrieved (S8). When the image data of all the pages has not been retrieved (S8: NO), the next page is set as the reference page (S10). Then, process proceeds to S6 and retrieves the image data for the reference page (i.e., next page) from the image storage 17. When image data of all the pages has been retrieved (S8: YES), process calculates the print cost when the image is printed in the normal print mode based on equation 1 below and stores the calculated cost in the print cost memory 14$f$ (S9).

$$\text{Cost}=Vk\times Pk+Vc\times Pc+Vm\times Pm+Vy\times Py \quad (1)$$

where, Vk denotes the value of the K dot counter, Pk denotes a unit price of the K dot, Vc denotes the value of the C dot counter, Pc denotes a unit price of the C dot, Vm denotes the value of the M dot counter, Pm denotes a unit price of the M dot, Vy denotes the value of the Y dot counter, and Py denotes a unit price of the Y dot.

The unit price Pk for a black dot in equation (1) represents a cost of black ink necessary for printing one dot of image in the normal print mode. The unit price Pk is stored in the ROM 13. Concretely, the unit price is calculated such that a price of an ink cartridge of the black ink (e.g., 20 dollars) is divided by the number of dots printable (e.g., $442\times10^5$ dots) using the ink cartridge (e.g., $Pk=5.9\times10^{-5}$).

Similarly, the unit prices Pc, Pm and Py for cyan, magenta and yellow dots in equation (1) represent costs of cyan, magenta and yellow ink necessary for printing one cyan dot, one magenta dot and one yellow dot, respectively, in the normal print mode. The unit prices Pc, Pm and Py are also stored in the ROM 13. Similar to the above case, each of the unit prices Pc, Pm and Py is calculated such that a price of an ink cartridge of the ink (e.g., 20 dollars) is divided by the number of dots printable (e.g., $442\times10^5$ dots) using the ink cartridge (e.g., Pc (Pm or Py)$=5.9\times10^{-5}$).

Next, process determines whether the value of the upper limit memory 14$g$ multiplied by the page number memory 14$a$ is smaller than the value stored in the print cost memory 14$f$ (S11). It should be noted that, in the upper limit memory 14$g$, the upper limit of the print cost set by the user for one page of image during the upper limit setting procedure shown in FIG. 6, which will be described later.

When the value of the upper limit memory 14$g$ multiplied by the page number memory 14$a$ (i.e., the estimated cost) is equal to or greater than the cost stored in the print cost memory 14$f$ (which is the cost when the printing is performed in the normal print mode) (S11: NO), then if the printing is performed using the same quantity of ink as in the normal print mode, the printing can be performed within the desired cost. In this case, value 1.0, which is the same value when the normal print mode is selected, is stored in the adjustment amount memory 14$h$ (S13).

When the value of the upper limit memory 14$g$ multiplied by the page number memory 14$a$ is less than the cost stored in the print cost memory 14$f$ (S11: YES), that is, when the printing is performed in the normal print mode, the cost of the consumed ink would exceed the planned price, the adjustment amount is calculated by multiplying the value stored in the page number memory 14$a$ with the value stored in the upper limit memory 14$g$ and then dividing the result with the value stored in the print cost memory 14$f$. Then, the thus calculated adjustment amount is stored in the adjustment amount memory 14$h$ (S12). As the user-intended print cost is smaller, the adjustment amount stored in the adjustment amount memory 14$h$ is smaller and the quantity of ink used in the printing is suppressed accordingly.

Next, process determines whether the adjustment amount stored in the ROM 13 is greater than a minimum adjustment amount (S14). In other words, process examines whether the amount of the ink is adjusted exceeding a maximum changeable amount (which is defined as a value calculated by subtracting the adjustment amount from one (1)). As described above, as the value of the adjustment amount is smaller, less quantity of the ink is used for the actual printing. Therefore, when the value of the adjustment amount is too small (i.e., when the changing amount of the ink is too large and exceeds the maximum changeable amount), the ink actually used in the printing is too small and a minimum quantity of the image may not be achieved.

When the adjustment amount is less than the minimum adjustment amount (S14: NO), a message is displayed on the LCD 5 to ask the user whether the quantity of the ink used for printing can exceed the quantity corresponding to the planned cost. In other words, the user is notified that if the printing is performed within the planned cost, an image having a sufficient quality cannot be obtained.

In S17, process determines whether the user has accepted that the printing cost exceeds the planed cost (S17). When the user accepted that the printing const can be greater than the planned cost by depressing a predetermined key (S17: YES), process stores the minimum adjustment amount, which has been preliminarily stored in the ROM 13, in the adjustment amount memory 14$h$ (S18). When the user wishes that the printing cost does not exceed the planned cost by operating another key (S17: NO), the value stored in the adjustment amount memory 14$h$ is remained unchanged, and process proceeds to S19. When the value stored in the adjustment amount memory 14$h$ is greater than the minimum adjustment amount (S14: YES), process proceeds to S19, the value stored in the adjustment amount memory 14$h$ unchanged.

In S19, process sets the first page of the image data stored in the image storage 17 as the reference page, and retrieve the image data of the reference page (S20). Next, based on the value of the adjustment amount stored in the adjustment amount memory 14$h$, the retrieved image data of the reference page is printed (S21). Specifically, in comparison with a case in the normal print mode, certain number of dots are omitted according to the value stored in the adjustment amount memory 14$h$ when the image is printed. With this control, the quantity of ink is reduced so that the printing cost does not exceed the user-planned cost.

For example, when the user has set the print cost to one cent for one page and prints ten pages of image, the total planned cost for the print job is 10 cents. If, in such a case, the print cost calculated in S9 (i.e., the cost in the normal print mode) is 20 cents, the adjustment amount is 0.5. Therefore, in S21, the printing is performed in S21 with the quantity of the ink is reduced (to the quantity in normal print mode ×0.5) by omitting certain dots. As a result, the print job is fished using the ink corresponding to the user's intended cost (e.g., 10 cents). Thus, the printing is performed with the maximum quantity of ink within the range of the planned cost.

In S22, process determines whether all the pages of the image data stored in the image storage 17 have been printed. If there remains one or more pages of the image data in the image storage 17 (S22: NO), the succeeding page is set as the reference page (S23) and process returns to S20. Then, as described above, the reference page of the image data is retrieved (S20), printed (S21) and then determination in S22 is executed. When all the pages of the image data have been printed (S22: YES), the printing procedure shown in FIG. 5 is finished.

FIG. 6 shows a flowchart illustrating the upper limit setting procedure, which is repeatedly executed at every predetermined interval.

In S31, process determines whether the fixed upper limit input button 4*a* is depressed. When the fixed upper limit input button 4*a* is not depressed (S31: NO), process proceeds to S36.

If the upper limit input button 4*a* is depressed with the upper limit flag 14*i* is ON (S32: YES), i.e., when the one-cent print mode is currently selected, the user intends to release the one-cent print mode. IN such a case, the fixed upper limit flag 14*i* is set to OFF and the fixed upper limit LED 4*c* is turned OFF (S35), and process proceeds to S36.

If the fixed upper limit flag 14*i* is OFF (S32: NO) when the fixed upper limit button 4*a* is depressed, the user intends to set the fixed upper limit value, and the fixed upper limit flag 14*i* is ON (i.e., the one-cent print mode is selected), the fixed upper limit LED 4*c* is turned ON, the arbitrary upper limit flag 14*j* is OFF and the arbitrary upper limit LED (not shown) is turned OFF (S33). Then, process proceeds to S34, where the fixed upper limit value (1) is stored in the upper limit memory 14*g*. Thereafter, process proceeds to S36.

In S36, process determines whether the arbitrary upper limit button 4*b* is depressed. When the arbitrary upper limit button 4*b* is not depressed (S36: NO), the upper limit setting procedure is finished.

When the arbitrary upper limit button 4*b* is depressed (S36: YES), process determines whether the arbitrary upper limit flag 14*j* is ON (S37). When the arbitrary upper limit button 4*b* is depressed with the arbitrary upper limit flag 14*j* being ON (i.e., the arbitrary limit print mode being currently selected) (S37: YES), user intends to release the arbitrary limit setting. In this case, process set the arbitrary upper limit flag to OFF, and turns of the arbitrary upper limit LED (not shown) in S42. When the arbitrary upper limit flag is OFF (S37: NO), the fixed upper limit flag 14*i* is set to OFF, fixed upper limit LED 4*c* is turned OFF, the fixed upper limit flag is set to ON and the arbitrary upper limit LED (not shown) is turned ON (S38). Further, process displays the input screen 5*a* (see FIG. 4) on the LCD 5 (S39).

Then, process determines whether the arbitrary upper limit has been input through the ten keys 4*d* (S40). When the arbitrary upper limit has not been input (S40: NO), process repeats S39. When the arbitrary upper limit has been input (S40: YES), the value input through the ten keys 4*d* is stored in the upper limit memory 14*g* (S41) and the upper limit setting procedure shown in FIG. 6 is finished.

According to the MFP 1 described above, the user can perform the printing within the planned printing cost easily in a relatively short period of time.

According to the MFP 1 described above, if the planed cost is higher than the cost in the normal print mode, the printing is executed using the similar amount of ink as would be required in the normal print mode.

According to the MFP 1 described above, when the planned cost would result in a relatively bad quality output, it is notified to the user before the image is printed. Therefore, useless printing operation can be avoided. Further, since the user can select to print ensuring the minimum quality of the image. In other words, according to the MFP 1 described above, the user can obtain the printed image having the minimum quality with suppressing the printing cost.

According to the MFP 1 described above, the cost for printing all the pages of the image is examined. Therefore, the suppression of usage of the ink can be averaged among the plurality of pages, and unevenness of the image quality among the printed pages can be avoided.

According to the MFP 1 described above, the upper limit of the print cost is set on a page basis. That is, the user can set the cost for one page of the image, and therefore, even if the data for all the pages are ready to be printed, the print job can be started. Accordingly, a print job can be performed quickly within the planned cost.

It should be noted that the invention need not be limited to the exemplary embodiment described above, and various modification can be realized without departing from the scope of the invention.

For example, in the above-described embodiment, the quantity of the ink to be used is calculated based on the total number of the dots included in predetermined image data stored in the image storage 17. This may be modified such that the consumed quantity is calculated based on the number of dots of one page of image data stored in the image storage 17. Such an example is shown in FIG. 7.

FIG. 7 is a flowchart illustrating the printing procedure according to the modification of the above described embodiment shown in FIG. 5. In FIG. 7, steps same as those in FIG. 5 are given the same step numbers. In the description below, only portions different from the above-described embodiment will be described.

Steps S51 and S52 correspond to S11 and S12 in FIG. 5. In S11 and S12, the upper limit value is multiplied with the number of pages. In S51 and S52, the number of pages is not multiplied, and the upper limit value itself is examined/used. In FIG. 7, one page of image data is retrieved in S6, and then whether the page of image data can be printed within the upper limit is determined in S51. When the print cost will not exceed the upper limit even if the image is printed in the normal print mode (S51: NO), value 1.0 is stored in the adjustment amount memory 14*h*. While, when the print cost would exceed the upper limit if printed in the normal print mode (S51: YES), the value in the upper limit memory 14*g* divided by the value in the print cost memory 14*f* is stored as the adjustment amount in the adjustment amount memory 14*h* (S52). Thus, in the modification, for each page of image data, the adjustment amount is calculated and printing is executed.

In S20, the retrieved page of image data is printed based on the adjustment amount calculated in S52. Until all the pages of the image data is printed (S22: NO), the succeeding page is set as the reference page (S53), and the image data corresponding to the reference page is retrieved (S6). Thereafter, the print cost is calculated, the adjustment amount for the reference page of image data is determined, and then the page is printed as described above.

According to the modification described above, the printing can be performed such that each page is printed quickly within the planned cost.

It should be noted that, in the above-described embodiment and modification, the number of dots to be printed is reduced according to the adjustment amount. However, the invention need not be limited to such a configuration. Alternatively or optionally, the ink ejecting amount for each dot may be changed in accordance with the adjustment amount.

In the embodiment and modification, the printer 25 is an inkjet printer. However, the invention could be applied to laser beam printer or LED printer. In such a case, by controlling the surface potential of a photoreceptive member in accordance with the adjustment amount, the consumption of the toner can be adjusted.

In the embodiment, the upper limit for one page is set. However, the upper limit may defined as the maximum cost for printing a predetermined number of pages of image data or the entire image data. In such a case, step S11 of FIG. 5 is replaced with a step of determining whether the upper limit is less than the print cost. Further, step S12 of FIG. 5 is replaced with a step of storing the upper limit divided by the print cost as the adjustment amount in the adjustment amount memory 14*h*.

In the above-described embodiment and modification, when the adjustment amount is less than the minimum adjustment amount, an inquiry asking the user whether the print cost exceeds the planned cost is issued. This may be modified such that an error message is displayed on the LCD 5 and the printing job is terminated when the adjustment amount is smaller than the minimum value.

In the embodiment, the fixed upper limit button 4*a* is explained to set one cent as the fixed upper limit. The invention need not be limited to such a configuration, and any other value can be used as the fixed upper limit.

The present disclosure relates to the subject matter contained in Japanese Patent Application No. 2003-283711, filed on Jul. 31, 2003, which is expressly incorporated herein by reference in its entirety.

What is claimed is:

1. An imaging device operable in a normal print mode and in an economical print mode, comprising:
- an image storage that stores image data;
- a consumption quantity calculating system that obtains a calculated quantity of a consumable substance which is consumed when the image data is printed in the normal print mode and obtains a calculated print cost based on the calculated quantity, the calculated quantity being obtained based on a number of dots to be printed;
- an upper limit setting system that sets an upper limit of a print cost;
- a consumption quantity modifying system that compares the upper limit with the calculated print cost and determines a usable quantity of the consumable substance when the image data is printed by modifying the calculated quantity so that the usable quantity is within a quantity corresponding to the upper limit of the print cost set by the upper limit setting system;
- a usable quantity modifying system that compares a change from the calculated quantity to the usable quantity with a predetermined changeable value, and, when the change from the calculated quantity to the usable quantity is greater than the predetermined changeable value, changes the usable quantity to a minimum value, and, when the change from the calculated quantity to the usable quantity is not greater than the predetermined changeable value, does not change the usable quantity, the minimum value being a smallest value to achieve sufficient quality as determined by a user; and
- a printing system that prints the image data stored in the image storage using the consumable substance such that the quantity of the consumable substance to be used is within the usable quantity.

2. The imaging device according to claim 1, wherein the upper limit setting system sets a predetermined value as the upper limit.

3. The imaging device according to claim 1, wherein the upper limit setting system allows a user to input an arbitrary value, which is set as the upper limit.

4. The imaging device according to claim 1, wherein the consumption quantity modifying system determines the usable quantity such that the quantity of the consumable substance in printing the image data is substantially equal to the quantity of the consumable substance corresponding to the upper limit.

5. The imaging device according to claim 1, further include an upper limit mode selecting system that selects an upper limit print mode in which the printing is performed based on the upper limit.

6. The imaging device according to claim 1,
- further comprising a comparing system that compares the calculated quantity of the consumable substance calculated by the consumption quantity calculating system with the quantity of the consumable substance corresponding to the upper limit,
- wherein the printing system prints the image data stored in the image storage using the consumable substance within a range of the usable quantity modified by the consumption quantity modifying system when the comparing system determines that the calculated quantity is greater than the quantity of the consumable substance corresponding to the upper limit.

7. The imaging device according to claim 1, wherein, when the change from the calculated quantity to the usable quantity is greater than the predetermined changeable value, the user is notified that the change from the calculated quantity to the usable quantity is greater than the predetermined changeable value.

8. The imaging device according to claim 1,
- wherein, when the image storage stores a plurality of pages of image data, the consumption quantity calculating system calculates the calculated quantity of the consumable substance based on the number of the print dots of all the pages of the image data stored in the image storage, and
- wherein the consumption quantity modifying system modifies the calculated quantity such that a total usable quantity of the consumable substance is equal to or less than a quantity corresponding to a total quantity of the consumable substance for printing the image at the upper limit.

9. The imaging device according to claim 1,
- wherein, when the image storage stores a plurality of pages of image data, the consumption quantity calculating system calculates the calculated quantity of the consumable substance based on the number of the print dots of each page of the image data stored in the image storage, and
- wherein the consumption quantity modifying system modifies, for each page of image data, the calculated quantity such that the usable quantity of the consumable substance is equal to or less than a quantity corresponding to a quantity of the consumable substance for printing the image at the upper limit.

10. The imaging device according to claim 9, wherein the upper limit setting system sets the upper limit of the print cost for printing an image on one recording sheet.

11. The imaging device according to claim 1,
- wherein the printing system prints a color image,
- wherein the consumable substance includes a plurality of color components, and wherein the consumption quantity calculating system calculates the calculated quantity of all the color components of the consumable substance.

12. An imaging device operable in a normal print mode and in an economical print mode, comprising:

an image storage that stores image data to be printed;

a cost calculating system that calculates a normal print cost representing a cost when the image stored in the image storage is printed in the normal print mode;

an upper limit setting system that sets an upper limit of the print cost;

an adjustment parameter determining system that determines an adjustment parameter representative of reduced quantity of a consumable substances when the image data is printed, the adjustment parameter being calculated based on the upper limit and the normal print cost such that a print cost is suppressed below the upper limit if the image data stored in the image storage is printed in accordance with the adjustment parameter;

an adjustment parameter modifying system that compares the adjustment parameter with a predetermined changeable value, and, when the adjustment parameter is smaller than the predetermined changeable value, modifies the adjustment parameter to be the predetermined changeable value, and, when the adjustment parameter is not smaller than the predetermined changeable value, uses the adjustment parameter, the predetermined changeable value being a smallest value to achieve sufficient quality as determined by a user; and a printing system that prints the image stored in the image storage in accordance with the adjustment parameter.

13. The imaging device according to claim 12, wherein the upper limit setting system sets a predetermined value as the upper limit.

14. The imaging device according to claim 12, wherein the upper limit setting system allows a user to input an arbitrary value, which is set as the upper limit.

15. The imaging device according to claim 12, wherein, when the normal print cost is greater than the upper limit, the printing system prints the image data in accordance with the adjustment parameter, and wherein, when the normal print cost is equal to or less than the upper limit, the printing system prints the image data in the normal print mode.

16. The imaging device according to claim 12, wherein, when the adjustment parameter is smaller than a predetermined value, the user is notified that the image quality will be low.

17. The imaging device according to claim 12, wherein the cost calculating system calculates the normal print cost based on the number of print dots of the image data.

18. The imaging device according to claim 17, further includes a data storage that stores a normal print cost for one dot of image data.

19. The imaging device according to claim 12, wherein the imaged data includes a plurality of pages of image data, and wherein the cost calculating system calculates the normal print cost for all the pages of the image data.

20. The imaging device according to claim 12, wherein the imaged data includes a plurality of pages of image data, and wherein the cost calculating system calculates the normal print cost for each page of the image data.

21. A non-transitory computer readable medium that includes computer readable instructions that cause a computer to function as an imaging device operable in a normal print mode and in an economical print mode, the computer readable instructions including the instructions of:

calculating a calculated quantity of a consumable substance which is consumed when the image data is printed in the normal print mode and calculating a calculated print cost based on the calculated quantity, the calculated quantity being obtained based on a number of dots to be printed;

setting an upper limit of a print cost;

comparing the upper limit with the calculated print cost;

determining a usable quantity of the consumable substance when the image data is printed by modifying the calculated quantity so that the usable quantity is within a quantity corresponding to the upper limit of the print cost;

comparing a change from the calculated quantity to the usable quantity with a predetermined changeable value, and, when the change from the calculated quantity to the useable quantity is greater than the predetermined changeable value, changing the usable quantity to a minimum value, and, when the change from the calculated quantity to the usable quantity is not greater than the predetermined changeable value, not changing the usable quantity, the minimum value being a smallest value to achieve sufficient quality as determined by a user; and printing the image data using the consumable substance such that the quantity of the consumable substance to be used is within the usable quantity.

* * * * *